J. C. MARTIN.
VISUAL TAIL LIGHT REFLECTOR.
APPLICATION FILED OCT. 1, 1917.
1,301,150.
Patented Apr. 22, 1919.
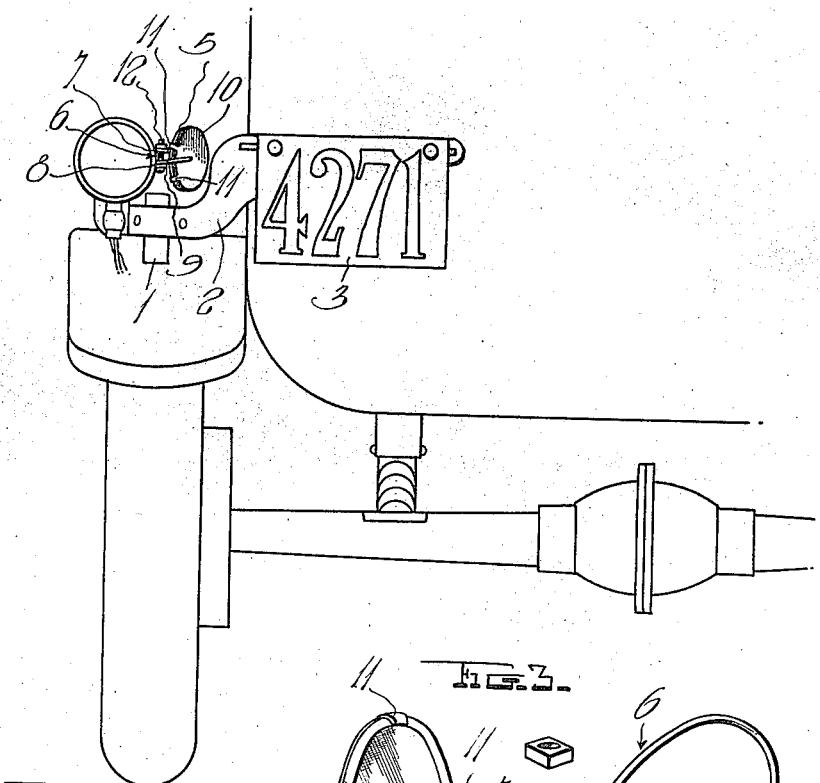
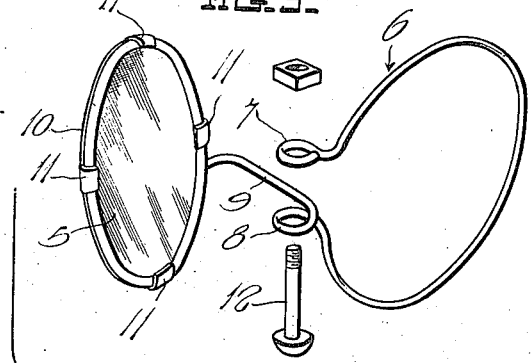
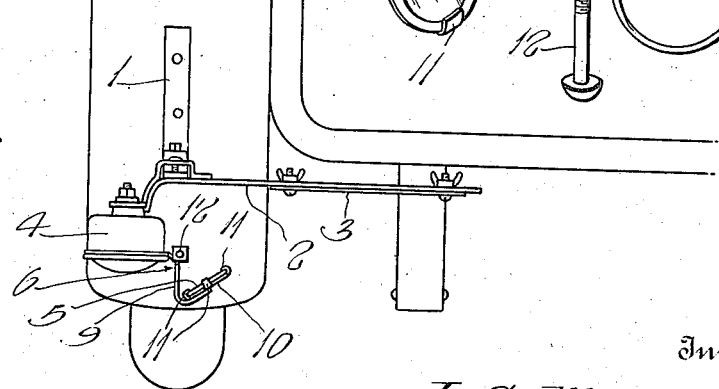
Witness
H. Woodard
Inventor
J. C. Martin
By H. B. Willson & Co.
Attorneys

UNITED STATES PATENT OFFICE.

JOHN C. MARTIN, OF FAULKTON, SOUTH DAKOTA.

VISUAL TAIL-LIGHT REFLECTOR.

1,301,150.  Specification of Letters Patent.  Patented Apr. 22, 1919.

Application filed October 1, 1917. Serial No. 194,255.

*To all whom it may concern:*

Be it known that I, JOHN C. MARTIN, a citizen of the United States, residing at Faulkton, in the county of Faulk and State of South Dakota, have invented certain new and useful Improvements in Visual Tail-Light Reflectors; and I do declare the following to be a full, clear, and exact description of the invention, such as will enable others skilled in the art to which it appertains to make and use the same.

My invention has for its object to provide a simple arrangement of parts whereby the driver of an automobile may ascertain whether or not the tail light of his machine is illuminated, by simply glancing toward the rear end of the car.

With the foregoing general object in view, the invention resides in the novel features of construction and unique combination of parts to be hereinafter fully described and claimed, the descriptive matter being supplemented by the accompanying drawings which constitute a part of this specification and in which:—

Figure 1 is a rear elevation of an automobile showing the application of the invention;

Fig. 2 is a top plan view of Fig. 1;

Fig. 3 is a perspective view of the mirror and the clamp by means of which it is attached to the tail light.

In the drawings above briefly described, the numeral 1 designates a lamp bracket preferably secured to one of the rear fenders of an automobile, a license tag bracket 2 being mounted on said bracket 1 and carrying a license tag 3 and a tail light 4 for displaying a red light in rear of the car and at the same time for illuminating the tag.

A mirror 5 is located so as to be in full view of the driver upon looking rearwardly, said mirror being so positioned in respect to the tail light 4 as to render the rays from the latter visible in the former. It will thus be obvious that the driver can ascertain at a glance whether or not the tail light is illuminated and may thus avoid the trouble and expense usually coincident with operating a machine without a visible rear light.

A novel clamp 6 is provided for securing the mirror 5 in place, said clamp being formed of a single piece of wire bent into the form of a split ring with its ends bent into eyes 7 and 8, one end of the wire being extended laterally at 9 after forming the eye 8 to provide an arm which is soldered, brazed, or otherwise secured to a backing plate 10 having claws 11 clenched around the edge of the mirror 5. The clamp 6 passes around the casing of the tail light 4 and a bolt 12 is passed through the alined eyes 7 and 8. By loosening this bolt, the device may be adjusted to the most advantageous point, and by bending the arm 9 to the required extent, the mirror may be positioned at the proper angle for giving the best results.

From the foregoing, taken in connection with the accompanying drawings, it will be obvious that although my invention is of extremely simple and inexpensive nature, it will be an effective means of attaining the end sought. Since the object of the device is best carried out by the particular features shown and described, such features constitute the preferred forms of the device, but it is to be understood that within the scope of the invention as claimed, numerous changes may be made without sacrificing the principal advantages.

I claim:

A device of the class described comprising a clamp for passage around a tail light, said clamp being formed of a single piece of wire bent into the form of a split ring with its ends bent to form alined eyes, one end of said wire, after forming one of said eyes, being extended laterally to form a bendable arm, a mirror supported by said arm, and a bolt passing through the aforesaid eyes for contracting the clamp around the tail light, bending of said arm permitting proper angular disposition of said mirror.

In testimony whereof I have hereunto set my hand in the presence of two subscribing witnesses.

JOHN C. MARTIN.

Witnesses:
B. HENESTED,
SYLVIA OSBORNE.